Patented July 12, 1938

2,123,536

UNITED STATES PATENT OFFICE 2,123,536

PROCESS FOR THE MANUFACTURE OF MULTICELLULAR GLASS

Bernard Long, Paris, France, assignor to Societe Anonyme des Manufactures des Glaces et Produits Chimiques de Saint Gobain, Chauny & Cirey, Paris, France.

No Drawing. Application May 27, 1935, Serial No. 23,709. In France May 28, 1934

12 Claims. (Cl. 49—77)

This invention relates to a process for the manufacture of sponge-like or multicellular glass and refers more particularly to a process of treating a glass-containing mixture in such manner that a porous vitreous product is obtained, which contains a plurality of cells which are separated one from the other.

An object of the present invention is the provision of a simple and efficient method of manufacturing multicellular glass, the structure of which will be more regular and uniform than that of the glass manufactured by any other methods.

Another object is the provision of multicellular glass the cells of which are distributed very evenly throughout the entire mass of the glass.

A further object of this invention is the provision of porous glass which is extremely light and the density of which is often as low as 0.35.

The above and other objects of the present invention, may be realized by mixing comminuted glass, or a mixture of fritted and ground vitreous substances, with one or more pulverized substances capable of developing gases or vapors at a certain temperature, and then by heating this mixture to this temperature, which should be one, at which the glass particles become soft and are joined one to the other simply by contact. The formation of gases or vapors may be caused either by a chemical reaction taking place between at least one of these pulverized substances, and the glass, or by a reaction taking place between the pulverized substances, or merely by a decomposition of the gas developing substances. The mass vitrified in this manner is cooled after the gases or vapors developed therein have increased the volume of the mass to the desired extent in order that it may have a certain predetermined apparent density.

Several methods of carrying out this invention will be described now by way of example:

First example

A mixture of pulverized reducing substances, such as, carbon or carbon-containing substances, carbides, particularly silicium carbide, silicium and ferro silicons, with a suitable amount of comminuted glass, preferably, aluminous glass which contains an alkaline sulphate or alkaline earth sulphate is placed into a mold. To this mixture may be added, if necessary, a small quantity of an adhesive substance such as gelatine, dextrine, or soda silicate.

Then the entire mixture is heated to a temperature at which the glass becomes plastic or soft, that is, to a temperature of about 800° C. or 900° C.

The reducing substances decompose the sulphate and give up bubbles of sulphurous gas which is often mixed with the carbonic gas. The bubbles remain within the mixture after it has become solid due to the great viscosity of glass.

The glass containing sulphate may be prepared by means of a vitrifiable mixture, the fusion of which is stopped before the refining process is commenced.

The glass may be composed of the following ingredients:

| | | |
|---|---|---|
| $SiO_2$ | 70.00 | or 72.70 |
| $Na_2O$ | 14.24 | 14.30 |
| CaO | 4.90 | 7.60 |
| MgO | | 3.00 |
| $Al_2O_3$ | 7.00 | 2.00 |
| $B_2O_3$ | 3.55 | |
| $SO_3$ | 0.30 | 0.40 |

Glass of the above type may be mixed with silicium carbide (popularly known under the trade name "Carborundum") in a proportion of 70% of the glass, to 30% of silicium carbide. When the total mixture is heated in the above-described manner, a porous glass is produced, the apparent density of which is as low as 0.35.

Second example

A vitreous mixture is mixed with another mixture consisting of finely pulverized silica, generally known under the name of "silica white", soda sulphate, and carbon, and is then heated.

At a temperature of about 850° C. silica reacts with the sodium sulphide which is produced by the reaction of soda sulphate with the carbon. Gases developed during the heating of the mixture make it possible to obtain a mu'ticellular glass, the density of which is equal to 0.45.

The vitreous mixture may contain the following ingredients:

| | |
|---|---|
| Comminuted glass | 90 |
| Silica white | 3 |
| Soda sulphate | 6 |
| Coal | 1 |

Third example

Glass particles are mixed with talcum or hydrated magnesium silicate. The mixture is heated until it reaches a temperature of about 850° C. At this temperature the hydrated magnesium silicate loses its hydration water which is transformed into steam. This steam swells the glass which has become plastic under the influence of heat and forms cells in the glass.

Fourth example

Pulverized glass is mixed with grains of kieselguhr or with infusory flours. These substances have very small pores which retain very strongly bubbles of air, or water vapor. The mixture is heated until at a temperature of about 900° C., the bubbles of air and steam are liberated and expand forming pores within the glass which has become plastic under the influence of heat.

Fifth example

Pulverized glass is mixed with pulverized coal. This mixture is projected into a mold heated to a temperature from 800° to 900° C. The mixture swells and fills the mold. In practice, 0.5 part of vegetable coal mixed with 100 parts of glass are sufficient to produce multicellular glass of which apparent density is 0.40.

In order to avoid that the glass sticks to the mold it has been found useful to use a mold made of graphite.

In all of the above described examples the comminuted glass may be replaced by vitrifiable substances which have not been vitrified as yet, but which have been simply fritted at a temperature of about 700° C. to 800° C. and then granulated.

Through the use of the described methods a multicellular glass may be obtained, the structure of which is much more regular than that of the sponge-like glass produced by any other methods. This is caused by the very uniform and even distribution of the gas and vapor bubbles throughout the entire vitreous mass. Furthermore, due to the very uniform distribution of the gas bubbles, the product obtained by the described methods is extremely light. It does not contain any parts which are more or less devoid of cells. Finally, due to the very small apparent density of the article, its surfaces can be treated much more conveniently by any mechanical utensils or machines generally used for shaping glass.

What is claimed is:

1. The process for the manufacture of multicellular glass, which comprises mixing solid comminuted vitreous substances with a pulverized substance capable of giving up gases, heating the mixture to a temperature at which the particles of the comminuted substance become soft and are joined to each other by mere contact, the second-mentioned substance being capable of producing gases at said temperature, interrupting the heating when the gases developed within the vitreous mass increase the volume thereof to the desired extent whereby cells are formed which are separated one from the other, and then cooling said mass, whereby multicellular glass of predetermined apparent density is produced.

2. The process for the manufacture of multicellular glass, which comprises mixing solid comminuted glass with pulverized substances capable of producing gases within a certain range of temperatures, heating the mixture to a temperature at which the particles of the comminuted glass become soft and are joined to each other by mere contact, the last-mentioned temperature being within the first-mentioned range of temperatures, interrupting the heating when the gases developed within the glassy mass increase the volume thereof to the desired extent whereby cells are formed which are separated one from the other, and then cooling said mass, whereby multicellular glass of predetermined apparent density is produced.

3. The process for the manufacture of multicellular glass, which comprises mixing comminuted glass with a pulverized substance capable of chemically reacting with said glass within a certain range of temperatures, a gas being produced in the course of said reaction, heating the mixture to a temperature at which the particles of the comminuted glass become soft and are joined to each other by mere contact, the last mentioned temperature being within the first mentioned range of temperatures, interrupting the heating when the gas developed within the glassy mass increases the volume thereof to the desired extent whereby cells are formed which are separated one from the other, and then cooling said mass, whereby multicellular glass of predetermined apparent density is produced.

4. The process for the manufacture of multicellular glass, which comprises mixing comminuted fritted vitrifiable substances with at least one pulverized substance capable of chemically reacting with said vitrifiable substances within a certain range of temperatures, a gas being produced in the course of said reaction, heating the mixture to a temperature at which the particles of the vitrifiable substances become soft and are joined to each other by mere contact, the last mentioned temperature being within the first-mentioned range of temperatures, the heating being continued until the mixture is vitrified, interrupting the heating when the gases developed within the vitrified mass increase the volume thereof to the desired extent whereby cells are formed which are separated one from the other, and then cooling said mass, whereby multicellular glass of predetermined apparent density is produced.

5. The process for the manufacture of multicellular glass, which comprises mixing a comminuted vitreous substance with pulverized substances capable of reacting with each other within a certain range of temperatures and of developing a gas in the course of this reaction, heating the mixture to a temperature at which the particles of the comminuted vitreous substance become soft and are joined to each other by mere contact, the last-mentioned temperature being within the first mentioned range of temperatures, interrupting the heating when the gas developed within the vitreous mass increases the volume thereof to the desired extent whereby cells are formed which are separated one from the other, and then cooling said mass, whereby multicellular glass of predetermined apparent density is produced.

6. The process for the manufacture of multicellular glass, which comprises mixing a solid comminuted vitreous substance with a pulverized substance capable of giving up a gaseous fluid within a certain range of temperatures, heating the mixture to a temperature at which the particles of the comminuted vitreous substance become soft and are joined to each other by mere contact, the last-mentioned temperature being within the first-mentioned range of temperatures, interrupting the heating when the gaseous fluid developed within the vitreous mass increases the volume thereof to the desired extent whereby cells are formed which are separated one from the other, and then cooling said mass, whereby multicellular glass of predetermined apparent density is produced.

7. The process of manufacturing multicellular glass, which comprises mixing comminuted glass containing alkaline sulphates with a reducing substance capable of reacting with said glass within a certain range of temperatures at least one gas being produced in the course of this reaction, heating the mixture to the softening temperature of said glass, said softening temperature being within said range of temperatures, interrupting the heating when the bubbles of said gas within the glassy mass increase the volume thereof to the desired extent whereby cells are formed which are separated one from the other, and then cooling said mass, whereby multicellular glass of predetermined apparent density is produced.

8. The process of manufacturing multicellular glass, which comprises mixing comminuted glass containing alkaline earth sulphates with a reducing substance capable of reacting with said glass within a certain range of temperatures, at least one gas being produced in the course of this reaction, heating the mixture to the softening temperature of said glass, said softening temperature being within said range of temperatures, interrupting the heating when the bubbles of said gas within the glassy mass increase the volume thereof to the desired extent whereby cells are formed which are separated one from the other, and then cooling said mass, whereby multicellular glass of predetermined apparent density is produced.

9. The process of manufacturing multicellular glass, which comprises mixing a comminuted vitreous substance containing a sulphate with a carbonaceous reducing substance capable of reacting with said vitreous substance within a certain range of temperatures, at least one gas being produced in the course of this reaction, heating the mixture to the softening temperature of said vitreous substance, said softening temperature being within said range of temperatures, interrupting the heating when the bubbles of said gas within the vitreous mass increase the volume thereof to the desired extent whereby cells are formed which are separated one from the other, and then cooling said mass, whereby multicellular glass of predetermined apparent density is produced.

10. The process of manufacturing multicellular glass, which comprises mixing a comminuted vitreous substance with a carbonaceous reducing substance capable of reacting with said vitreous substance within a certain range of temperatures, at least one gas being produced in the course of this reaction, heating the mixture to the softening temperature of said vitreous substance, said softening temperature being within said range of temperatures, interrupting the heating when the bubbles of said gas within the vitreous mass increase the volume thereof to the desired extent whereby cells are formed which are separated one from the other, and then cooling said mass, whereby multicellular glass of predetermined apparent density is produced.

11. The process of manufacturing multicellular glass, which comprises mixing a comminuted vitreous substance with a mixture containing finely pulverized silica, soda sulphate and coal, heating the mixture to the softening temperature of said vitreous substance, said softening temperature being within the range of temperatures at which the mixture develops gas, interrupting the heating when the bubbles of said gas within the vitreous mass increase the volume thereof to the desired extent whereby cells are formed which are separated one from the other, and then cooling said mass, whereby multicellular glass of predetermined apparent density is produced.

12. The process of manufacturing multicellular glass, which comprises mixing a solid comminuted vitreous substance with pulverized coal, projecting this mixture into a mold heated to the range of temperatures at which the particles of the comminuted glass are joined to each other by mere contact, and at which gas is developed by coal, interrupting the heating when the bubbles of said gas within the vitreous mass increase the volume thereof to the desired extent whereby cells are formed which are separated one from the other, and then cooling said mass, whereby multicellular glass of predetermined apparent density is produced.

BERNARD LONG.